(12) United States Patent
Carmel et al.

(10) Patent No.: US 9,241,165 B2
(45) Date of Patent: Jan. 19, 2016

(54) CONTROLLING A COMPRESSION OF AN IMAGE ACCORDING TO A DEGREE OF PHOTO-REALISM

(71) Applicant: I.C.V.T. LTD., Tel-Aviv (IL)

(72) Inventors: Sharon Carmel, Ramat HaSharon (IL); Dror Gill, Haifa (IL); Tamar Shoham, Netanya (IL)

(73) Assignee: BEAMR IMAGING LTD, Tel-Aviv (IL)

( * ) Notice: Subject to any disclaimer, the term of this patent is extended or adjusted under 35 U.S.C. 154(b) by 0 days.

(21) Appl. No.: 14/387,811

(22) PCT Filed: Jan. 27, 2013

(86) PCT No.: PCT/IL2013/050073
§ 371 (c)(1),
(2) Date: Sep. 24, 2014

(87) PCT Pub. No.: WO2013/144942
PCT Pub. Date: Oct. 3, 2013

(65) Prior Publication Data
US 2015/0063693 A1 Mar. 5, 2015

Related U.S. Application Data

(60) Provisional application No. 61/616,630, filed on Mar. 28, 2012.

(51) Int. Cl.
*G06K 9/00* (2006.01)
*H04N 19/154* (2014.01)
(Continued)

(52) U.S. Cl.
CPC .............. *H04N 19/154* (2014.11); *G06K 9/036* (2013.01); *G06K 9/4647* (2013.01); *G06T 7/408* (2013.01); *H04N 19/124* (2014.11); *H04N 19/176* (2014.11)

(58) Field of Classification Search
CPC ..... H04N 19/154; H04N 19/176; H04N 1/41; G06T 7/408; G06K 9/036; G06K 9/4647
USPC ......................................................... 382/166
See application file for complete search history.

(56) References Cited

U.S. PATENT DOCUMENTS

2002/0003543 A1* 1/2002 Deering ......................... 345/581
2003/0086127 A1* 5/2003 Ito et al. ........................ 358/462
(Continued)

FOREIGN PATENT DOCUMENTS

WO 03/049036 A2 6/2003
WO 2011042898 A1 4/2011

OTHER PUBLICATIONS

Athitsos, et al. "Distinguishing Photographs and Graphics on the World Wide Web." Content-Based Access of Image and Video Libraries, 1997. Proceedings. IEEE Workshops on. IEEE, 1997.
Garbarino, Maurizio. "Automatic classification of natural and synthetic images" Skolan för datavetenskap och kommunikation, Kungliga Tekniska högskolan, 2008.
(Continued)

*Primary Examiner* — Ali Bayat
(74) *Attorney, Agent, or Firm* — Browdy and Neimark, PLLC

(57) ABSTRACT

A method of controlling a compression of an image according to a degree of photo-realism in the image, comprising computing a value indicating a degree of photo-realism for an input image based on a distribution of pixel luminance values within the image, calculating a configuration parameter based on the photo-realism value for the image, and configuring an encoder to compress the image according to the configuration parameter.

16 Claims, 12 Drawing Sheets

(51) Int. Cl.
*G06K 9/03* (2006.01)
*H04N 19/176* (2014.01)
*H04N 19/124* (2014.01)
*G06K 9/46* (2006.01)
*G06T 7/40* (2006.01)

(56) References Cited

U.S. PATENT DOCUMENTS

| | | | | |
|---|---|---|---|---|
| 2004/0095601 | A1* | 5/2004 | Ozawa | 358/1.15 |
| 2004/0217956 | A1* | 11/2004 | Besl et al. | 345/419 |
| 2005/0213836 | A1 | 9/2005 | Hamilton | |
| 2008/0055331 | A1 | 3/2008 | Iourcha et al. | |

OTHER PUBLICATIONS

Khalsa et al. "Advance Image Classification System" (IJCSIT) International Journal of Computer Science and Information, vol. 5(3), 2014 pp. 3210-3214.

Khalsa et al. "Novel method for classification of Artificial and Natural Images" International Journal of Scientific & Engineering Research, vol. 5(3), Mar. 2014.

Lienhart, et al. "Classifying Images on the Web Automatically." Journal of Electronic Imaging 11.4(2002): 445-454.

Prabhakar et al. "Picture-graphics color image classification" in Proc. ICIP(2), 2002, pp. 785-788.

Tian-Tsong Tg, et al. "Physics-Motivated Features for Distinguishing Photographic Images and Computer Graphics" Proceedings of the 13th annual ACM intrnational conference on Multimedia. ACM, 2005.

Wang, et al.. "On Discrimination Between Photorealistic and Photographic Images." Proc. of IEEE International Conf. on Acoustics, Speech, and Signal Processing, Toulouse, France, May 2006.

SAID. Compression of Compound Images and Video for Enabling Rich Media in Embedded Systems. Visual Communications and Image Processing, vol. 5308, 2004. pp. 69-82. [retrieved on Jul. 11, 2013]. Retrieved from the Internet: <URL:http://www.hpl.hp.com/techreports/2004/HPL-2004-89.pdf>. entire document.

* cited by examiner

CONTROLLING A COMPRESSION OF AN IMAGE ACCORDING TO A DEGREE OF PHOTO-REALISM

CROSS-REFERENCE TO RELATED APPLICATIONS

This application is a 371 U.S. National Stage of International Application No. PCT/IL2013/050073, filed Jan. 27, 2013. This application claims the benefit of U.S. Provisional Application No. 61/616,630, filed Mar. 28, 2012. The entire disclosures of the above applications are incorporated by reference herein.

FIELD

The present invention is in the field of image compression control and configuration.

SUMMARY

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operation data can be used by a presently disclosed component(s). By way of example, such operational data can be stored on tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

Examples of the presently disclosed subject matter relate to a method and a system for controlling a compression of an image according to a degree of photo-realism in the image. According to an aspect of the presently disclosed subject matter there is provided a method of controlling a compression of an image according to a degree of photo-realism in the image. According to examples of the presently disclosed subject matter, the method can include: computing a value indicating a degree of photo-realism for an input image based on a distribution of pixel luminance values within the image; calculating a configuration parameter based on the photo-realism value for the image; and configuring an encoder to compress the image according to the configuration parameter.

According to examples of the presently disclosed subject matter, the method can further include tiling the input image giving rise to a plurality of image tiles; computing a value indicating a degree of photo-realism for each one of a plurality of input image tiles based on a distribution of pixel luminance values within the respective input image tile; calculating a configuration parameter for each one of the plurality of tiles based on the photo-realism value that was computed for the tile; and configuring an encoder to compress each one of the plurality of tiles according to its respective configuration parameter.

Further by way of example, a configuration parameter for a tile having a relatively low photo-realism value is effective for configuring the encoder to apply a relatively low compression level to the respective tile.

In still further examples of the presently disclosed subject matter, computing can include computing the value indicating a degree of photo-realism for an input image based on a numerical distribution of pixel luminance values within the input image.

In yet further examples of the presently disclosed subject matter, computing includes processing a histogram of the input image which denotes the distribution of pixel luminance values within the input image.

By way of example, processing the histogram can include computing a relation among histogram bins having a value that is above an average and histogram bins having a value below the average.

In yet further examples of the presently disclosed subject matter, the photo-realism measure can be associated with a spatial distribution of the pixel luminance values within the input image.

According to examples of the presently disclosed subject matter, computing can include processing values of adjacent pixels to determine a local smoothness score representing a relation between a number of adjacent pixels having a relation which meets a first smoothness criterion and a number of adjacent pixels having a relation which meets a second smoothness criterion, where the second smoothness criterion demands a substantially higher degree of smoothness relative to the first smoothness criterion.

In further examples of the presently disclosed subject matter, computing can include processing values of adjacent pixels to determine a sharp edge score representing a relation between a number of adjacent pixels having a relation which meets an edge criterion and a number of adjacent pixels having a relation which meets a sharp edge criterion.

In still further examples of the presently disclosed subject matter, processing the histogram comprises can include computing a relation between histogram bins having a maxima value and an average value of the bins.

In yet further examples of the presently disclosed subject matter, processing the histogram can include computing a relation among histogram bins having a maxima value and values of histogram bins on either side of the histogram bins having the maxima value.

By way of example, processing the histogram can include computing absolute differences between adjacent histogram bins.

According to further examples of the presently disclosed subject matter, there is provided a system for controlling a compression of an image according to a degree of photo-realism in the image. According to examples of the presently disclosed subject matter, the system can include a photo-realism scoring module, a processor and an encoder configurator. The photo-realism scoring module can be adapted to compute a value indicating a degree of photo-realism for an input image based on a distribution of pixel luminance values within the image. The processor can be adapted to calculate a configuration parameter based on the photo-realism value for the image. The encoder configurator can be adapted to configure an encoder to compress the image according to the configuration parameter.

In further examples of the presently disclosed subject matter, the system can further include a histogram generation module that is adapted to provide the histogram of pixel luminance values within the input image.

According to yet another aspect of the invention according to the currently disclosed subject matter there is provided a computer program product comprising a computer useable medium having computer readable program code embodied therein for controlling a compression of an image according to a degree of photo-realism in the image. According to examples of the presently disclosed subject matter, the computer program product can include: computer readable program code for: computing a value indicating a degree of photo-realism for an input image based on a distribution of pixel luminance values within the image; calculating a configuration parameter based on the photo-realism value for the image; and configuring an encoder to compress the image according to the configuration parameter.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
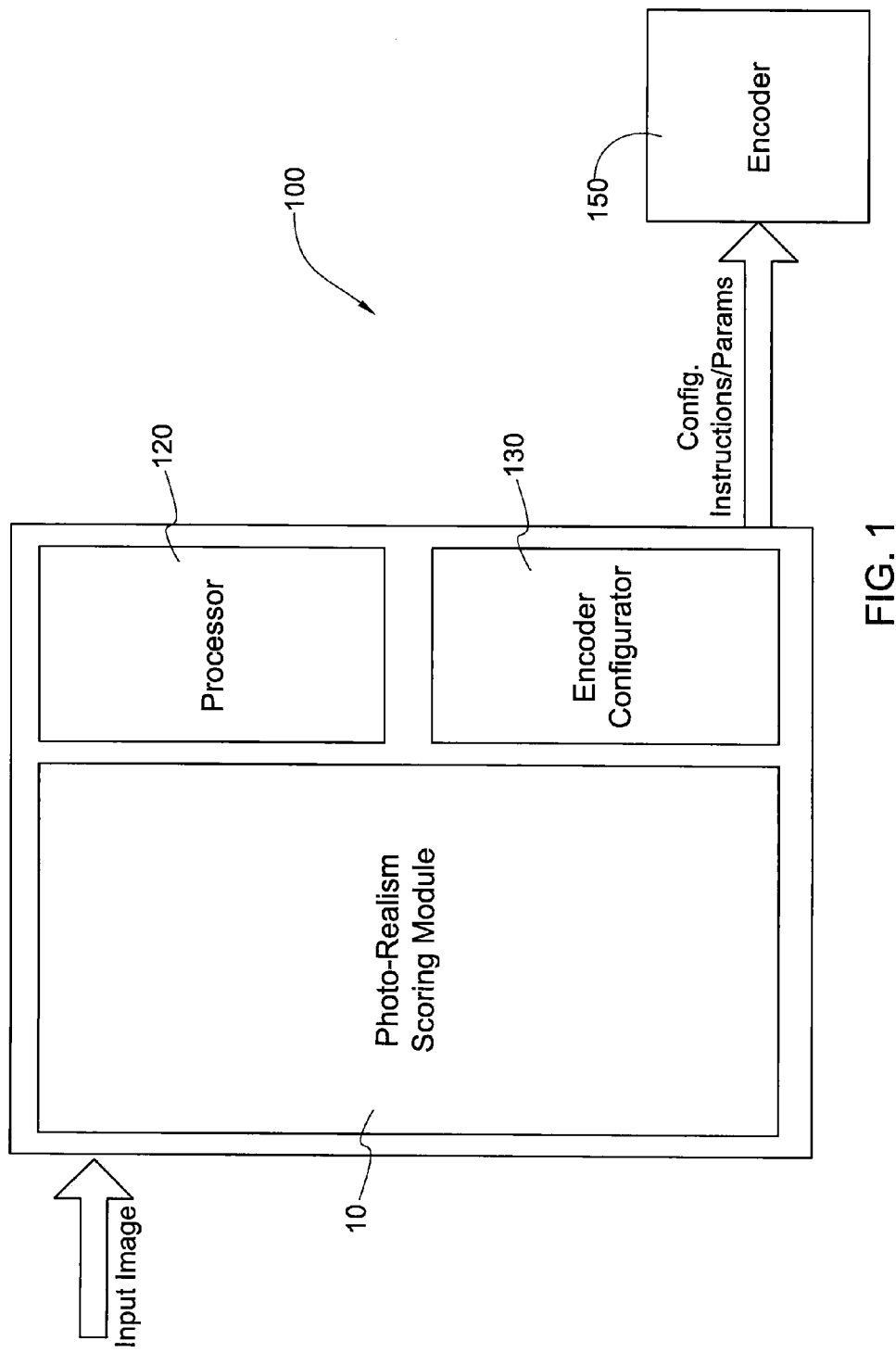
FIG. 1 is a block diagram illustration of a system for controlling a compression of an image according to a degree of photo-realism in the image, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

According to an aspect of the presently disclosed subject matter, there is provided a method of and a system for controlling a compression of an image according to a degree of photo-realism in the image. In this regard, it would be appreciated that an image can include content which is not photo-realistic, for example, synthetic content such a graphics. Some images can have a combination of photo-realistic and non-photo-realistic (e.g., synthetic) content. Examples of the presently disclosed subject matter can be used to rank (e.g., provide a value) a degree of photo-realism for an input image based on a distribution of pixel luminance values within the image, calculate a configuration parameter based on the photo-realism value, and configure an encoder to compress the image according to the calculated configuration parameter. Thus, examples of the presently disclosed subject matter, enable adaptive encoding of an image according to an evaluation of a degree of photo-realism that is based on a distribution of pixel luminance values within the image.

For convenience the terms "non-photo-realistic" and "synthetic" are used interchangeably throughout the description and in the claims. However, the use of the term "synthetic" should not be construed as limiting the scope of the presently disclosed subject matter. Rather, examples of the presently disclosed subject matter can be used to compute a value indicating a degree of photo-realism for an input image, and in this regard, the value ranks a degree of photo-realism (or lack thereof).

Provided below is a list of conventional terms in the field of image processing. For each of the terms below a short definition is provided in accordance with each of the term's conventional meaning in the art. The terms provided below are known in the art and the following definitions are provided as a non-limiting example only for convenience purposes. Accordingly, the interpretation of the corresponding terms in the claims, unless stated otherwise, is not limited to the definitions below, and the terms used in the claims should be given their broadest reasonable interpretation.

Throughout the description of examples of the presently disclosed subject matter and in the claims, reference is made to the term "photo-realistic content". The term photo-realistic content can be used to describe photographic content that was created by an optic device, for instance an image captured by a camera (e.g., a stills camera or a video camera) or an optic capture of a physical object or scene. It would be appreciated that an image that is captured by a camera can undergo digital processing, but so long as the digital processing is not overly extensive, the processed image remains "photo-realistic". As further processing is applied to an image, its level of "photo-realism" decreases. There can be numerous levels of "photo-realism". Examples of the presently disclosed subject matter provide measures for evaluating a degree of photo-realism in an image or in an image tile, as will be further described below.

Throughout the description of examples of the presently disclosed subject matter and in the claims, reference is made to the term "non-photo-realistic content". The term non-photo-realistic content can be used to describe content which was derived from a computer or that has undergone computer processing to an extent that it appears to have been created by a computer. As more sophisticated computer graphics techniques are used to render an image by a computer, its level of "non-photo-realism" decreases. Similarly to photo-realistic content, there can be numerous levels of "non-photo-realism". Examples of the presently disclosed subject matter provide measures for evaluating a degree of photo-realism in an image or in an image tile, and as such also evaluate a degree of non-photo-realism in an image or in an image tile.

Throughout the description of examples of the presently disclosed subject matter and in the claims, reference is made to the term "image". The term image can be used to describe a two dimensional ("2D") array of pixels. An image as used throughout the description and in the claims can include a still image or a discrete video frame from a video sequence consisting of a plurality of discrete video frames. Furthermore, an image as used herein can relate to an image consisting of photo-realistic content, an image consisting of non-photo-realistic content, and an image consisting of various levels of photo-realistic or non-photo-realistic content, or to an image which consists of different areas, each one of them containing content with various levels of photo-realism and non-photo-realism.

Reference is now made to FIG. 1, wherein is a block diagram illustration of a system for controlling a compression of an image according to a degree of photo-realism in the image, according to examples of the presently disclosed subject matter. According to examples of the presently disclosed subject matter, the system 100 for controlling a compression of an image according to a degree of photo-realism in the image can include a photo-realism scoring module 10, a processor 120 and an encoder configurator 130. According to examples of the presently disclosed subject matter, the system 100 can receive as input an image (captioned "input image" in FIG. 1), and can provide configuration instructions or configuration parameters to an encoder 150. The encoder 150 can be an image encoder or a video encoder.

Figure 2:
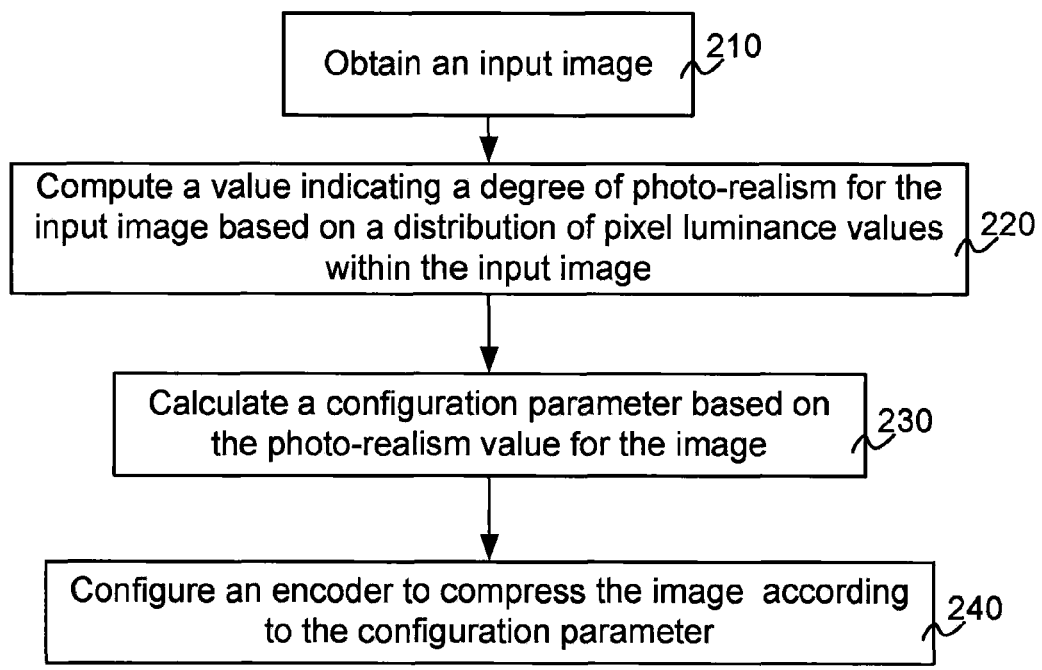
FIG. 2 is a flow chart illustration of a method of controlling a compression of an image according to a degree of photo-realism in the image, according to examples of the presently disclosed subject matter.

Reference is now additionally made to FIG. 2, which is a flow chart illustration of a method of controlling a compression of an image according to a degree of photo-realism in the image, according to examples of the presently disclosed subject matter. For convenience, examples of the method of controlling a compression of an image according to a degree of photo-realism in the image are described herein with reference to the functional components of the system for controlling a compression of an image according to a degree of photo-realism in the image shown in FIG. 1. However, it should be appreciated that in further examples of the presently disclosed subject matter, the method of controlling a compression of an image according to a degree of photo-realism in the image that is illustrated in FIG. 2 and described herein with reference to FIG. 2 can be implemented on other systems having other configurations and/or different setups.

Reverting now to FIG. 2, according to examples of the presently disclosed subject matter, an input image can be received at the system 100 (block 210). As mentioned above the input image can be a 2D array of pixels including a still image or a discrete video frame from a video sequence consisting of a plurality of discrete video frames. The input image can have a relatively photo-realistic content, a relatively synthetic content or the input image can consist of areas having a relatively photo-realistic content and other areas having a relatively synthetic content. It would be appreciated that here, and throughout the description of examples of the presently disclosed subject matter, the image content is regarded as lying on a photo-realistic-synthetic continuum, and instead of classifying an image as either photo-realistic or synthetic, measures are used for evaluating a degree of photo-realism, or in other words the measures are used to evaluate where on the photo-realistic-synthetic continuum the content of the image (or of an area of the image) lies, and this information is used to configure an encoder.

The input image can be fed to the photo-realism scoring module 10. According to examples of the presently disclosed subject matter, the photo-realism scoring module 10 can be adapted to compute a value indicating a degree of photo-realism for the input image based on a distribution of pixel luminance values within the input image (block 220). It would be appreciated that while various examples of the presently disclosed subject matter are described as including a computation of a degree of photo-realism that is based on a distribution of pixel luminance values within the input image, further examples of the presently disclosed subject matter can include computation of a distribution of pixel values in other images planes. By way of example, in case the image is a JPEG image, the hereinbelow described measures can also be applied to one or both of the chrominance planes of the image, in addition or as an alternative to the measure applied in the luminance plane. In other image types, the hereinbelow described measures can be applied to other planes of the image, as appropriate.

There are various measures which can be used, for example by the photo-realism scoring module 10, to compute the value indicating a degree of photo-realism and which use the distribution of pixel luminance values within the input image to compute the value. In particular examples of the presently disclosed subject matter, relate to various such measures. It would be appreciated that the method of controlling a compression of an image according to a degree of photo-realism in the image can use different ones of the herein disclosed measures and different combinations of such measures. Likewise, the system for controlling a compression of an image according to a degree of photo-realism in the image can implement different ones of the herein disclosed measures and different combinations of such measures.

It should be noted, that the output of the computation in block 220 is a value which indicates a degree of photo-realism for the input image, rather than a classification of the content in the images. In block 230, a configuration parameter is calculated based on the photo-realism value for the image. The calculation of the configuration parameter can be carried out, for example, by the processor 120. According to examples of the presently disclosed subject matter, the processor can use a preset function, algorithm or look-up-table ("LUT") to compute the configuration parameter based on the computed photo-realism value.

The configuration parameter that was calculated based on the photo-realism value can be used to configure an encoder to compress the image (block 240). For example, the system can include an encoder configurator 130 that is configured to receive as input the configuration parameter from the processor 120 and is operative for programming the encoder 150 to encode the image according to the configuration parameter that was calculated based on the photo-realism value. It would be appreciated that there can be a plurality of configuration parameters that are calculated by the processor 120 based on the photo-realism value and which are used by the encoder configurator 130 to configure the encoder 150. According to examples of the presently disclosed subject matter the encoder configurator 130 can be adapted to use any suitable application programming interface ("API") or any other interface to interact with the encoder 150, and in particular to program or otherwise configure the encoder according to the configuration parameters that were calculated other otherwise determined based on the photo-realism value.

According to examples of the presently disclosed subject matter, in general terms, the higher the level of photo-realism in the input image, as represented by the photo-realism value, the higher the compression rate which is represented by the configuration parameter which the processor computes for the input image. Thus, for images which are evaluated as being "highly" photo-realistic the processor is configured to provide a compression parameter which would cause the encoder to use a relatively high compression rate when compressing the input image, whereas for images which are evaluated as being "highly" synthetic, the processor is configured to provide a compression parameter which would cause the encoder to use a relatively low compression rate when compressing the input image.

It would be appreciated that different images can have content which is rated at different levels of photo-realism. In fact, in some respects and for some applications, classifying an image as "synthetic" or "photo-realistic" is not satisfactory, and a finer evaluation of the degree of photo-realism may be required. For example, in some images significant digital processing can be applied to the image to a degree where the image is less photo-realistic, but on the other hand the processed image should not be considered as synthetic. Rather, what is important to know for some applications, is to what extent or degree the image is "photo-realistic". For example, for perceptually lossless compression application (or recompression in case the input image is already compressed), applying too-much compression to an image which has content that is somewhere between "purely" photo-realistic and "purely" synthetic can create undesired artifacts on the one hand, but on the other hand, it is still safe to use a compression level that is higher than that that would have been safe for use with a purely synthetic image. In yet further images, some parts of the image can have content which is "very" "synthetic", whereas other parts are "photo-realistic", and yet other areas of the images can have a combination of "synthetic" and "photo-realistic" content. For some applications, such as perceptually lossless recompression for example, it can be useful to know the degree of photo-realism of the image's content, and it can be further useful to know the degree of photo-realism in different areas of the image. Examples of the presently disclosed subject matter enable to determine for a given input image a value indicating a degree of photo-realism for the input image, based on a distribution of pixel luminance values within the image, and to calculate and apply a configuration parameter based on the photo-realism value for the image. In still further examples of the presently disclosed subject matter, the degree of photo-realism value can be computed for an area of an input image (a tile) and the photo-realism value can be used to calculate and apply a configuration parameter for the respective area of the image. In this manner, an encoder can be configured to encode different areas of the image can using different compression parameters based on the value indicating the degree of photo-realism that was computed for each area, as will be further described below.

Figure 3:
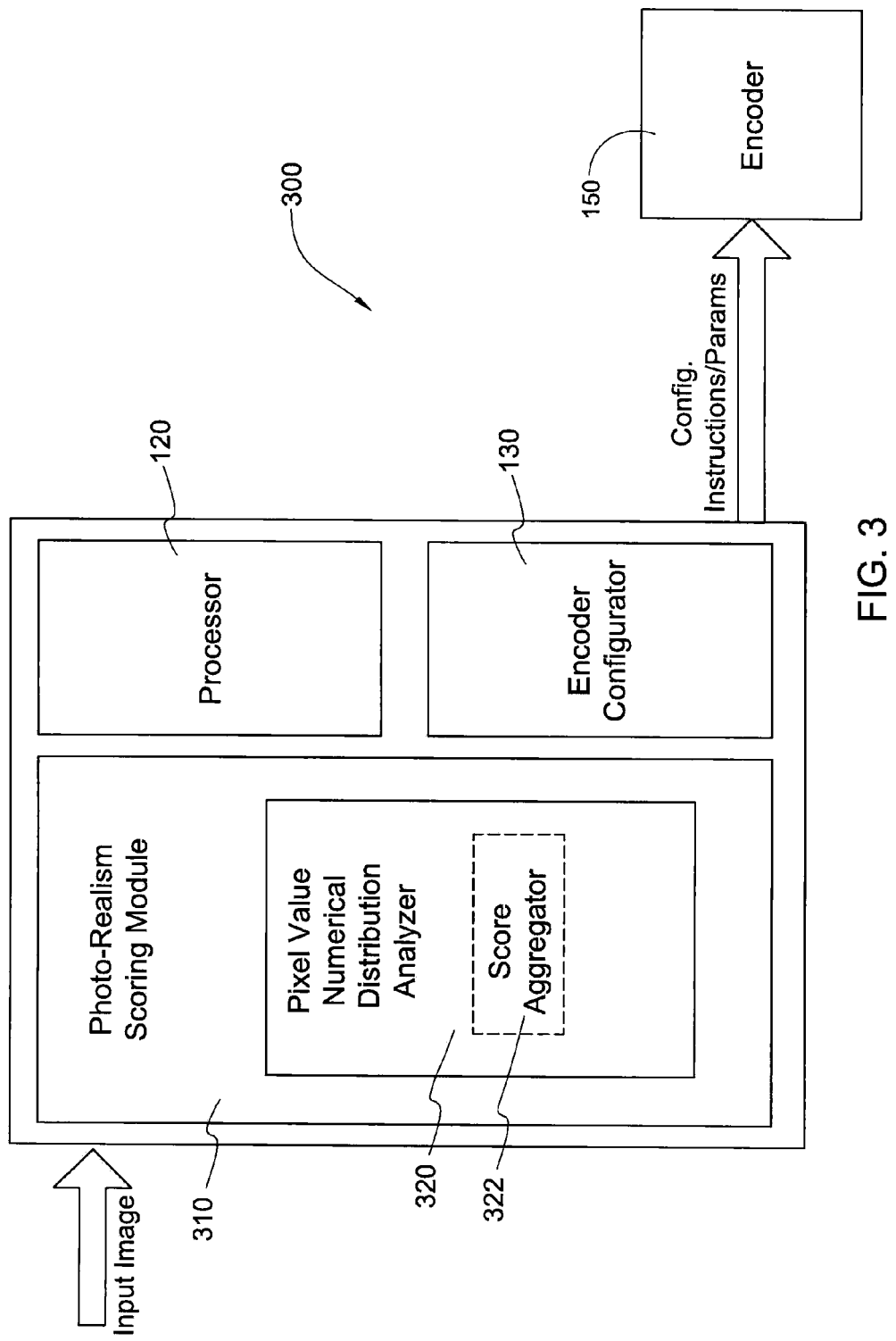
FIG. 3 is a block diagram illustration of a system for controlling a compression of an image according to a degree of photo-realism in the image that is calculated based on a numerical distribution of pixel luminance values within the input image, according to examples of the presently disclosed subject matter.

Further details with respect to possible implementations of the method of and system for controlling a compression of an image according to a degree of photo-realism in the image are now described. Referring now to FIG. 3, there is provided a block diagram illustration of a system for controlling a compression of an image according to a degree of photo-realism in the image that is calculated based on a numerical distribution of pixel luminance values within the input image, according to examples of the presently disclosed subject matter. Further reference is made to FIG. 4, which is a flowchart illustration of a method of controlling a compression of an image according to a degree of photo-realism in the image that is calculated based on a numerical distribution of pixel luminance values within the input image, according to examples of the presently disclosed subject matter.

Figure 4:
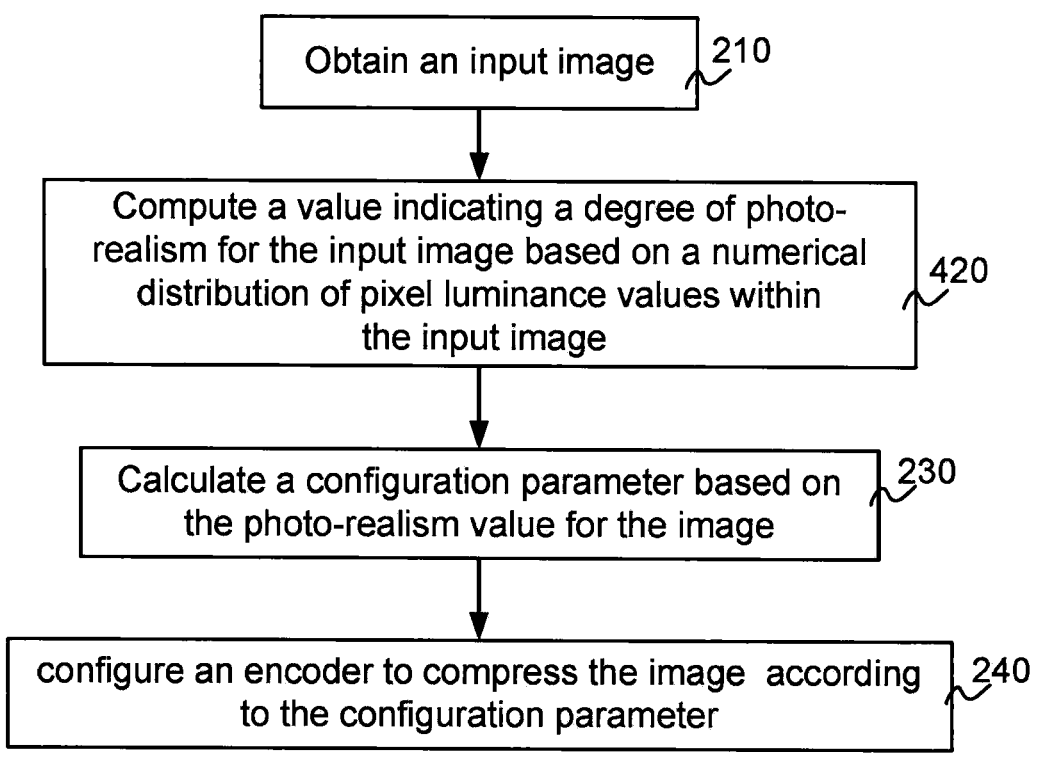
FIG. 4 is a flowchart illustration of a method of controlling a compression of an image according to a degree of photo-realism in the image that is calculated based on a numerical distribution of pixel luminance values within the input image, according to examples of the presently disclosed subject matter.

In FIG. 3, the photo-realism scoring module 310, which is part of the system 300 for controlling a compression of an image according to a degree of photo-realism in the image, includes a pixel value numerical distribution evaluation module 320. In FIG. 4, following receipt of the input image (block 210), a value indicating a degree of photo-realism for the input image can be computed based on a numerical distribution of pixel luminance values within the input image (block 420). According to examples of the presently disclosed subject matter, the photo-realism value can be computed by the pixel value numerical distribution evaluation module 320, which can be configured to apply a certain measure to evaluate a numerical distribution of pixel luminance values within the input image.

Further by way of example, the pixel value numerical distribution evaluation module 320 can be configured to process a histogram of the input image which denotes the numerical distribution of pixel luminance values within the input image. Various examples of measures of a numerical distribution of pixel luminance values within the input image which can be calculated based on—a histogram of the input image to provide a value indicating a degree of photo-realism are described below. It would be appreciated that in some examples of the presently disclosed subject matter any one or any combination of these measures, and possibly also further or other measures can be used to provide a value indicating a degree of photorealism in a given input image based on a numerical distribution of pixel luminance values within the input image.

Still further by way of example, the computation of the value indicating a degree of photo-realism for the input image can be computed based on a plurality of values which are computed using different measures of a numerical distribution of pixel luminance values within the input image. According to examples of the presently disclosed subject matter, the plurality of photo-realism values can be aggregated and combined to provide a single value which indicates a degree of photo-realism for the input image. According to examples of the presently disclosed subject matter, pixel value numerical distribution evaluation module 320 can include an aggregator 322 that is configured to combine and possibly also to normalize a plurality of values which are computed using different measures of a numerical distribution of pixel luminance values within the input image. The aggregator 322 can provide a value which represents the total value or score which indicates the degree of photo-realism in the input image that was computed based on the numerical distribution of pixel luminance values within the input image.

In further examples of the presently disclosed subject matter, the photo-realism value that is computed based on a numerical distribution of pixel luminance values within the input image can possibly be combined with a photo-realism value(s) which was computed using other measures, as will be further described below.

Resuming the description of FIG. 4, as already described above, the value indicating a degree of photo-realism in the input image, which is in this case computed based on the numerical distribution of pixel luminance values within the input image, can be used to calculate a configuration parameter (block 230), and the encoder 150 can be programmed to compress the input image according to the calculated configuration parameter (block 240).

Figure 5:
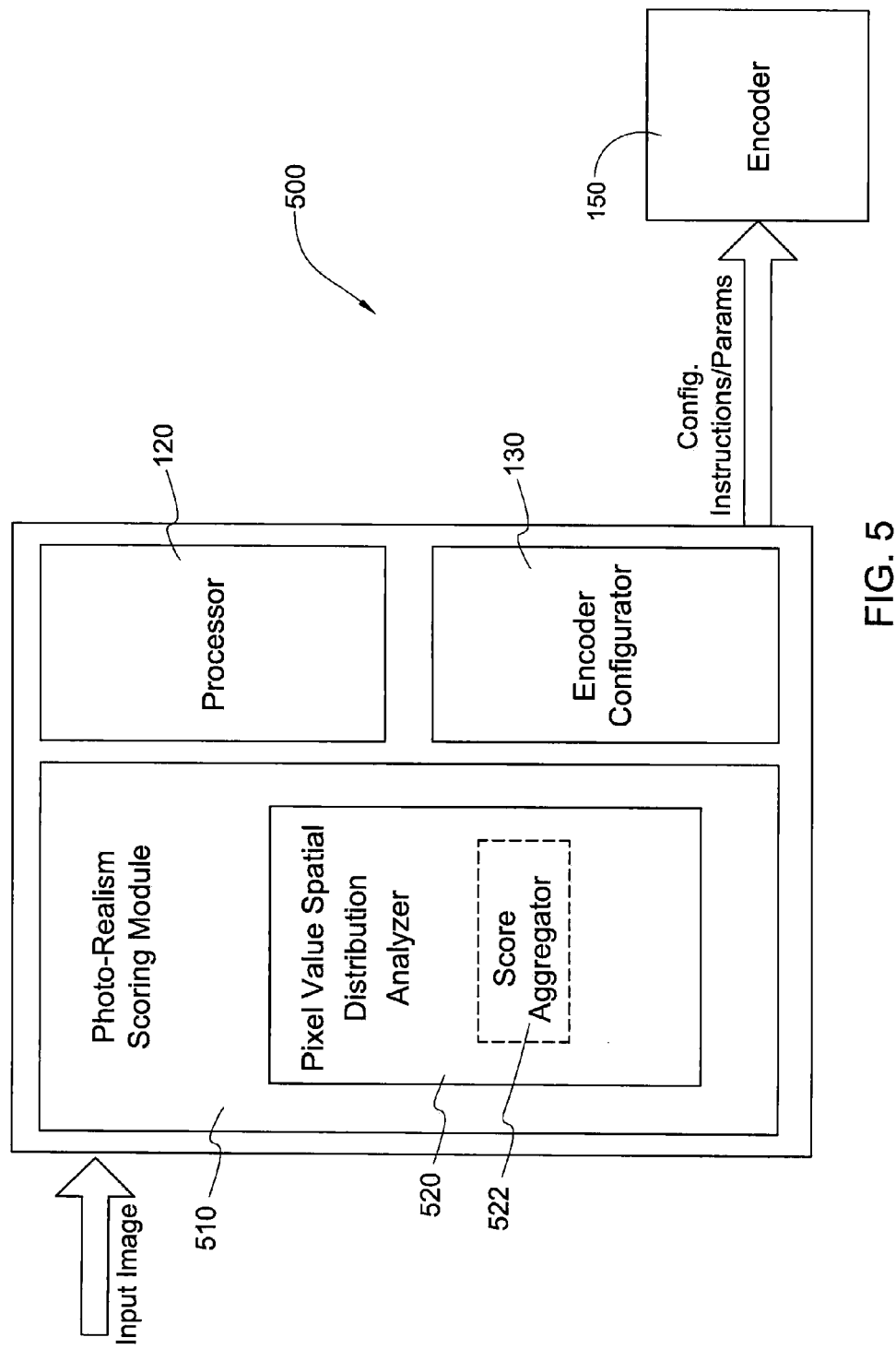
FIG. 5 is a block diagram illustration of a system for controlling a compression of an image according to a degree of photo-realism in the image that is calculated based on a spatial distribution of pixel luminance values within the input image, according to examples of the presently disclosed subject matter.

Referring now to FIG. 5, there is shown a block diagram illustration of a system for controlling a compression of an image according to a degree of photo-realism in the image that is calculated based on a spatial distribution of pixel luminance values within the input image, according to examples of the presently disclosed subject matter. Further reference is made to FIG. 6, which is a flowchart illustration of a method of controlling a compression of an image according to a degree of photo-realism in the image that is calculated based on a spatial distribution of pixel luminance values within the input image, according to examples of the presently disclosed subject matter.

Figure 6:
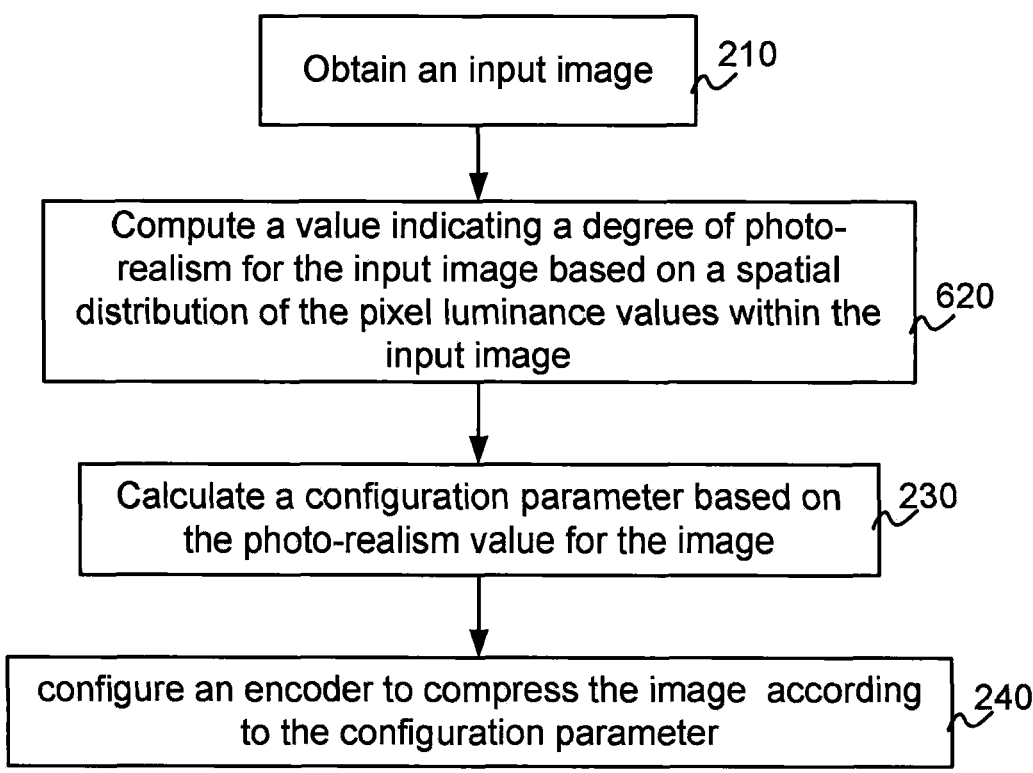
FIG. 6 is a flowchart illustration of a method of controlling a compression of an image according to a degree of photo-realism in the image that is calculated based on a spatial distribution of pixel luminance values within the input image, according to examples of the presently disclosed subject matter.

In FIG. 5, the photo-realism scoring module 510, which is part of the system 500 for controlling a compression of an image according to a degree of photo-realism in the image, includes a pixel value spatial distribution evaluation module 520. In FIG. 6, following receipt of the input image (block 210), a value indicating a degree of photo-realism for the input image can be computed based on a spatial distribution of pixel luminance values within the input image (block 620). According to examples of the presently disclosed subject matter, the photo-realism value can be computed by the pixel value spatial distribution evaluation module 520, which can be configured to apply a certain measure to evaluate a spatial distribution of pixel luminance values within the input image.

Further by way of example, the pixel value spatial distribution evaluation module 520 can be configured to process pixel values from the input image and to derive a score or a value based on the spatial distribution of pixel luminance values within the input image. Various examples of measures of a spatial distribution of pixel luminance values within the input image which can be used to provide a value indicating a degree of photo-realism are described below. It would be appreciated that in some examples of the presently disclosed subject matter any one or any combination of these measures, and possibly also further or other measures can be used to provide a value indicating a degree of photorealism in a given input image based on a spatial distribution of pixel luminance values within the input image.

Still further by way of example, the computation of the value indicating a degree of photo-realism for the input image can be computed based on a plurality of values which are computed using different measures of a spatial distribution of pixel luminance values within the input image. According to examples of the presently disclosed subject matter, the plurality of photo-realism values can be aggregated and combined to provide a single value which indicates a degree of photo-realism for the input image. According to examples of the presently disclosed subject matter, pixel value spatial distribution evaluation module 520 can include an aggregator 522 that is configured to combine and possibly also to normalize a plurality of values which are computed using different measures of a spatial distribution of pixel luminance values within the input image. The aggregator 522 can provide a value which represents the total value or score which indicates the degree of photo-realism in the input image that was computed based on the spatial distribution of pixel luminance values within the input image.

In further examples of the presently disclosed subject matter, the photo-realism value that is computed based on a spatial distribution of pixel luminance values within the input image can possibly be combined with a photo-realism value(s) which was computed using other measures, such as the values indicating a degree of photo-realism in the input image that was computed based on a numerical distribution of pixel luminance values within the input image, as will be further described below. This example is further discussed below.

Resuming the description of FIG. 6, the value indicating a degree of photo-realism in the input image, which is in this case computed based on the spatial distribution of pixel luminance values within the input image, can be used to calculate a configuration parameter (block 230), and the encoder can be programmed to compress the input image according to the calculated configuration parameter (block 240).

Figure 7:
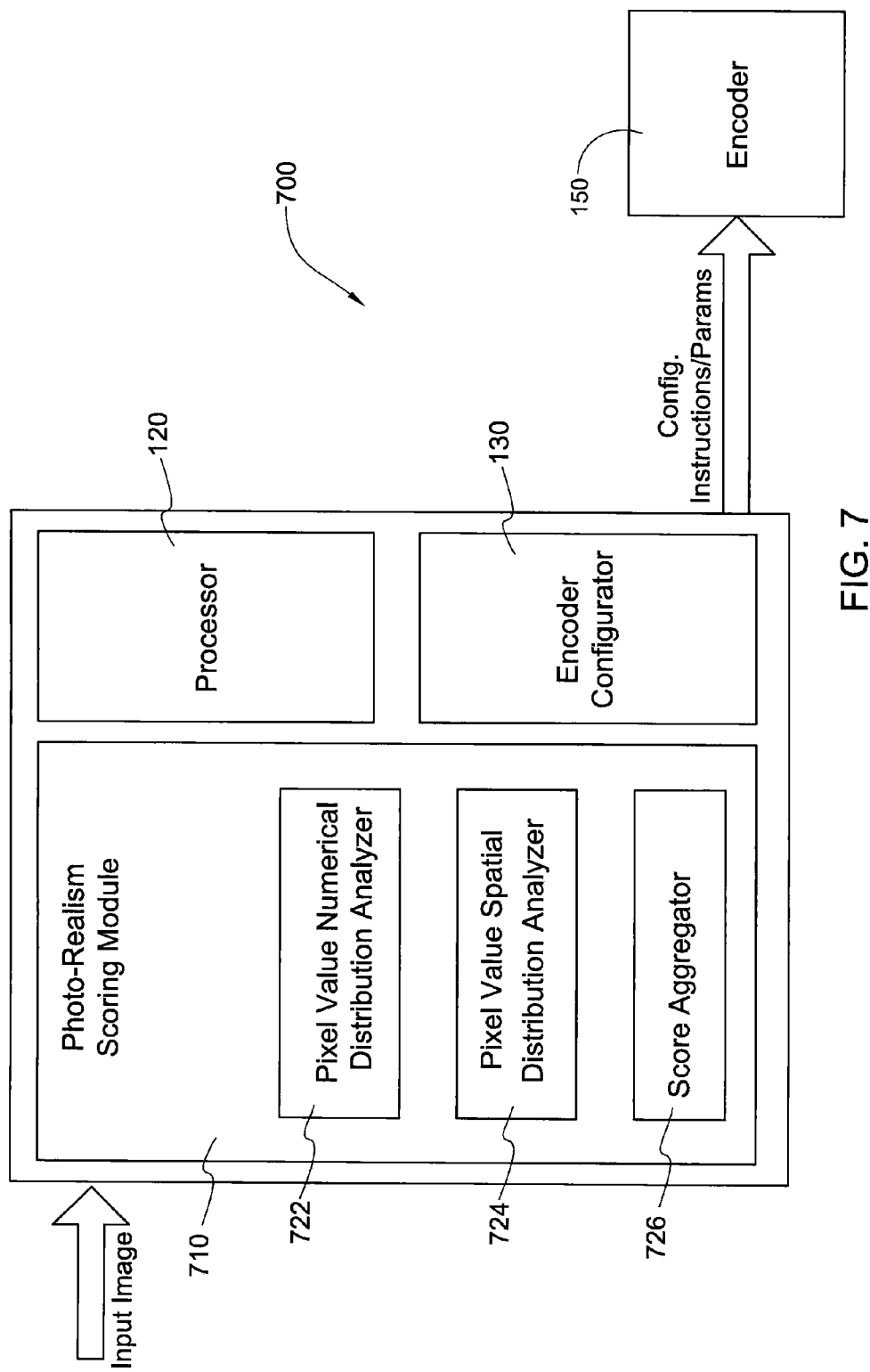
FIG. 7 is a block diagram illustration of a system for controlling a compression of an image according to a degree of photo-realism in the image that is calculated based on a numerical distribution of pixel luminance values within the input image and further based on a spatial distribution of pixel luminance values within the input image, according to examples of the presently disclosed subject matter.

As mentioned above, according to examples of the presently disclosed subject matter, a value indicating a degree of photo-realism in an input image can be computed based on a numerical distribution of pixel luminance values within the input and further based on a spatial distribution of pixel luminance values within the input image. Referring now to FIG. 7, there is shown a block diagram illustration of a system for controlling a compression of an image according to a degree of photo-realism in the image that is calculated based on a numerical distribution of pixel luminance values within the input image and further based on a spatial distribution of pixel luminance values within the input image, according to examples of the presently disclosed subject matter. Further reference is made to FIG. 8, which is a flowchart illustration of a method of controlling a compression of an image according to a degree of photo-realism in the image that is calculated based on a numerical distribution of pixel luminance values within the input image and further based on a spatial distribution of pixel luminance values within the input image, according to examples of the presently disclosed subject matter.

Figure 8:
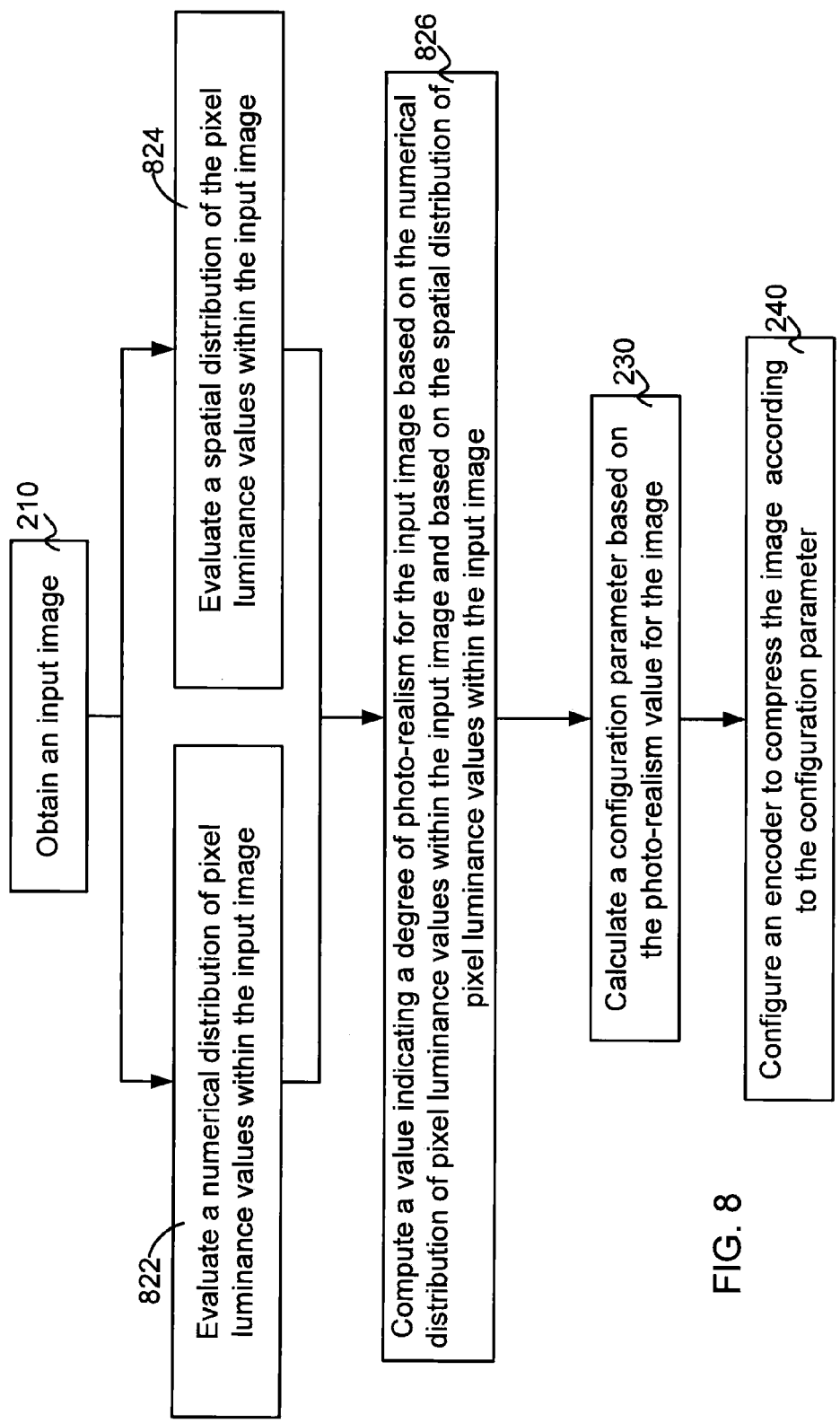
FIG. 8 is a flowchart illustration of a method of controlling a compression of an image according to a degree of photo-realism in the image that is calculated based on a numerical distribution of pixel luminance values within the input image and further based on a spatial distribution of pixel luminance values within the input image, according to examples of the presently disclosed subject matter.

In FIG. 7, the photo-realism scoring module 710, which is part of the system 700 for controlling a compression of an image according to a degree of photo-realism in the image, includes both a pixel value numerical distribution module 722 and a pixel value spatial distribution evaluation module 724. In FIG. 8, following receipt of the input image (block 210), evaluations of the degree of photo realism in the input image are performed are carried out, including an evaluation that is based on a numerical distribution of pixel luminance values within the input image (block 822) and an evaluation that is based on a spatial distribution of pixel luminance values within the input image (block 824). The evaluation that is based on the numerical distribution of pixel luminance values within the input image can be carried out by the pixel value numerical distribution module 722, and the evaluation that is based on the spatial distribution of pixel luminance values within the input image can be carried out by the pixel value spatial distribution evaluation module 724.

According to examples of the presently disclosed subject matter, the results of the evaluations in block 822 and 824 can be processed to provide a value indicating a degree of photo-realism for the input image that is based on the numerical distribution of pixel luminance values within the input image and based on the spatial distribution of pixel luminance values within the input image (block 826). For example, the results of the evaluations in block 822 and 824 can be normalized and combined to provide a single value. Still further by way of example, the system 700 can include a score aggregator 726, which is configured to compute the value indicating a degree of photo-realism for the input image based on the results of the evaluations in blocks 822 and 824.

There is now provided a description of various measures which can be used to compute the value indicating a degree of photo-realism and which use the distribution of pixel luminance values within the input image to compute the value. Initially there is provided a description of measures which are based on an evaluation of a numerical distribution of pixel luminance values within the input image, followed by a description of measures which are based on an evaluation of a spatial distribution of pixel luminance values within the input image. It would be appreciated that the method of and the system for controlling a compression of an image according to a degree of photo-realism in the image can use different ones of the herein disclosed measures and different combinations of such measures. Likewise, according to examples of the presently disclosed subject matter, additional measures can be as part of the evaluation of a degree of photo-realism in an input-image, either as an alternative to the herein disclosed measures, or in combination with one or more of the measures described herein.

Figure 9:
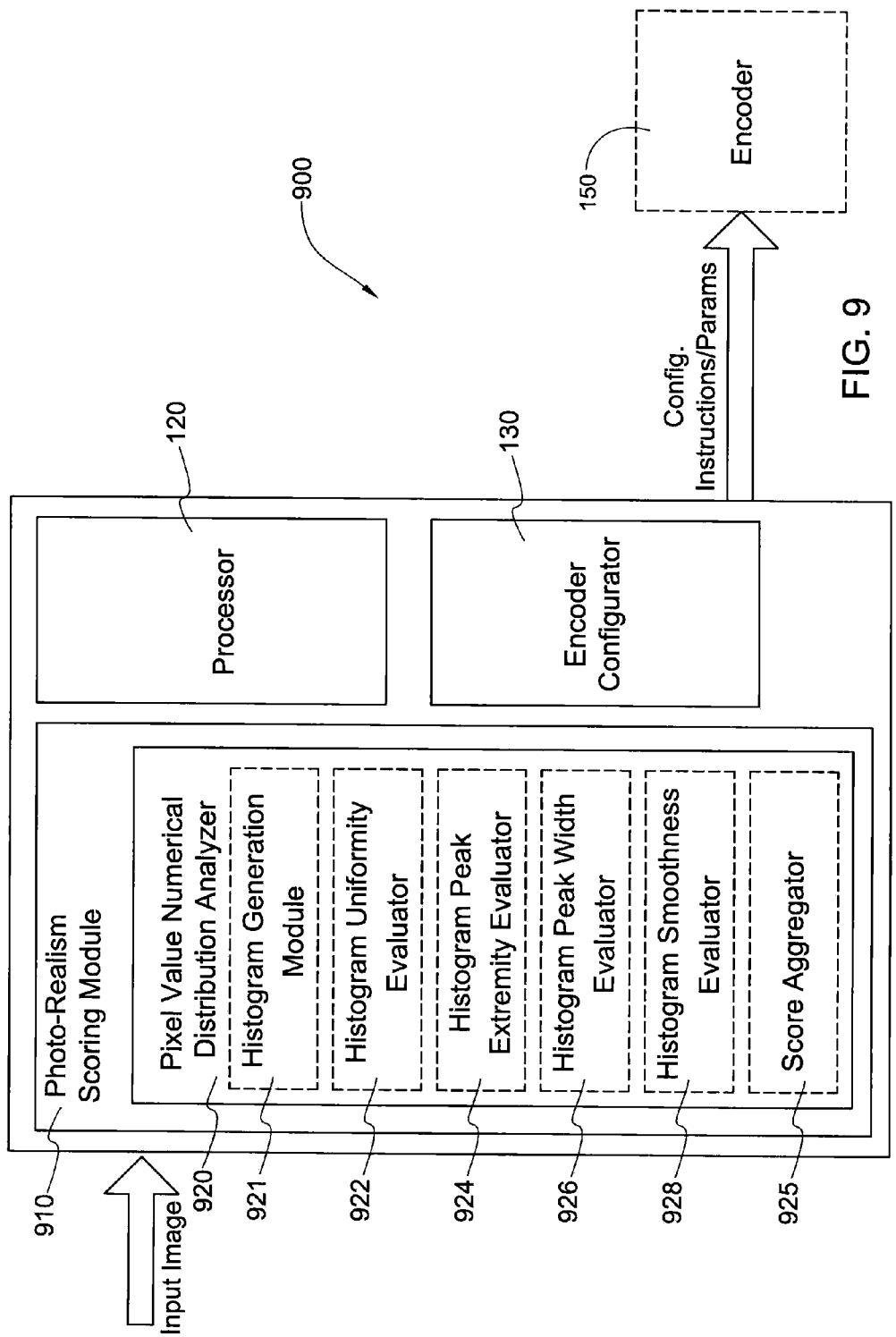
FIG. 9 is a block diagram illustration of a system for controlling a compression of an image according to a degree of photo-realism in the image that is calculated based on various measures of a numerical distribution of pixel luminance values within the input image, according to examples of the presently disclosed subject matter.

Reference is now made to FIG. 9, which is a block diagram illustration of a system for controlling a compression of an image according to a degree of photo-realism in the image that is calculated based on various measures of a numerical distribution of pixel luminance values within the input image, according to examples of the presently disclosed subject matter. According to examples of the presently disclosed subject matter, the system 900 can have a photo-realism scoring module 910 which in turn includes a pixel value numerical distribution evaluation module 920, and the pixel value numerical distribution evaluation module 920 can consist of one or more of the following: a histogram uniformity evaluator 922, a histogram peak extremity evaluator 924, a histogram peak width evaluator 926 and a histogram smoothness evaluator 928. The pixel value numerical distribution evaluation module 920 can further include a histogram generation module 921, and a score aggregator 925.

Figure 10:
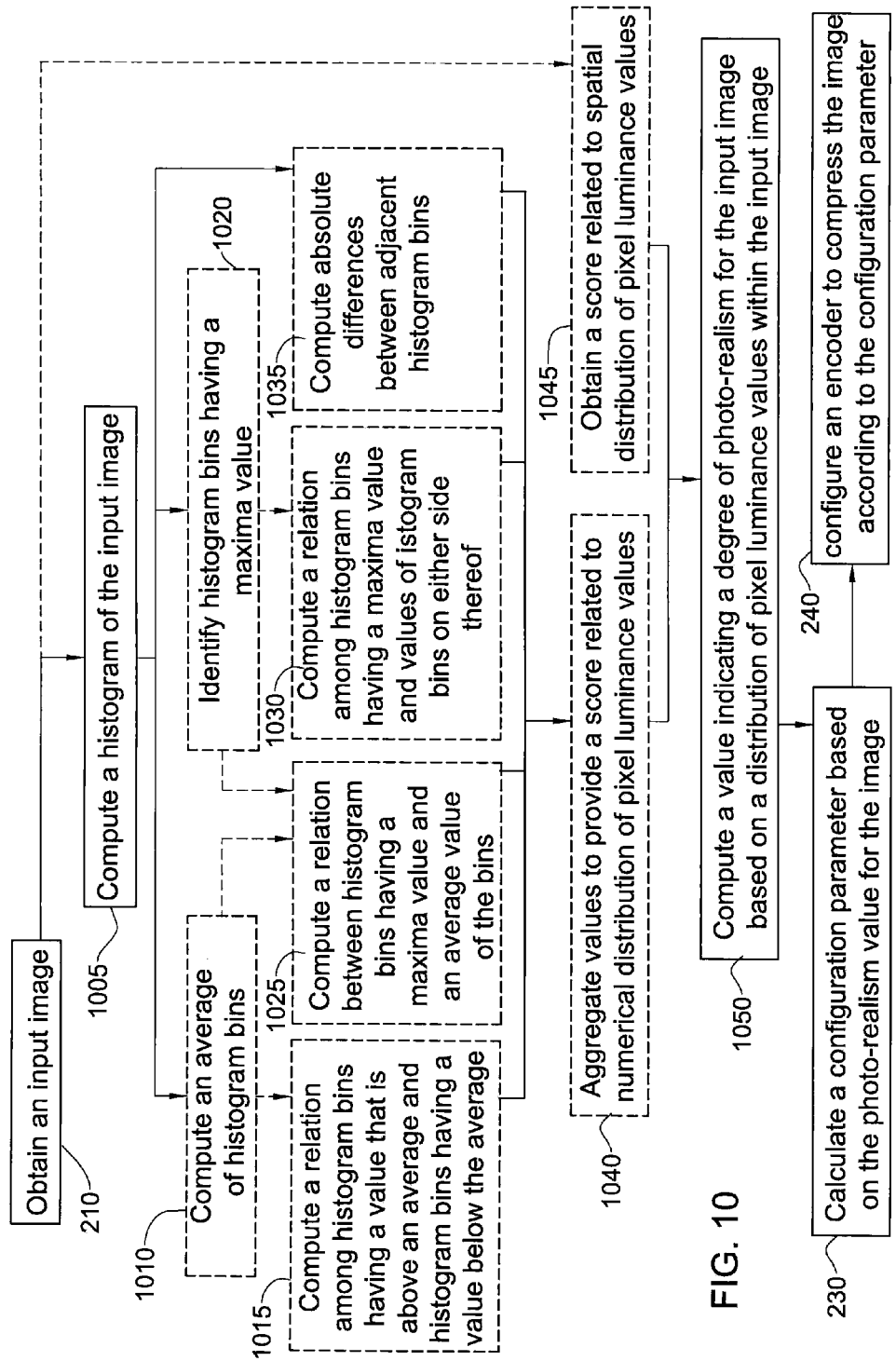
FIG. 10 is a flowchart illustration of a method of controlling a compression of an image according to a degree of photo-realism in the image that is calculated based on various measures of a numerical distribution of pixel luminance values in the input image, according to examples of the presently disclosed subject matter.

Reference is now additionally made to FIG. 10, which is a flowchart illustration of a method of controlling a compression of an image according to a degree of photo-realism in the image that is calculated based on various measures of a numerical distribution of pixel luminance values in the input image, according to examples of the presently disclosed subject matter. According to examples of the presently disclosed subject matter, an input image can be received at the system 900 (block 210).

According to examples of the presently disclosed subject matter, at block 1005, a histogram can be computed for the input image. For example, the histogram can be computed by the histogram generation module 921. Still further by way of example, assuming the luminance pixel values of the input image are—in the range 0-255 for an 8-bit image plane, then a 256 bin histogram can be computed. Still further by way of example, the measures of a degree of photo-realism in the input image that are based on a numerical distribution of pixel luminance values within the input image can be computed over the histogram values, as will now be described in more detail.

There is provided a description of several measures of a degree of photo-realism in the input image that are based on a numerical distribution of pixel luminance values within the input image. In accordance with examples of the presently disclosed subject matter, one or more of the measures described below can be implemented as part of an evaluation of a degree of photo-realism for an input image that is based on a numerical distribution of pixel luminance values within the input image. It would be appreciated that in further examples of the presently disclosed subject matter, one or more additional measures including measures that are based on an evaluation of a degree of photo-realism for an input image that is based on a numerical distribution of pixel luminance values within the input image and/or measures that are based on an evaluation of a degree of photo-realism for an input image that is based on a spatial distribution of pixel luminance values within the input image, can be combined with any one or with any combination of the measures described hereinbelow.

One measure of a degree of photo-realism in an input image that is based on a numerical distribution of pixel luminance values within the input image and which can be used as part of examples of the presently disclosed subject matter, can involve an evaluation of a degree of uniformity of the histogram, or to provide an estimate of how much of the histogram energy lies in 'peaks'. This measure can involve the computation at block 1015, as described below. At block 1010, an average of the histogram bins can be computed, and a relation among histogram bins having a value that is above an average and histogram bins having a value below the average can be computed at block 1015. The average of the histogram bins and the relation among histogram bins having a value that is above an average and histogram bins having a value below the average can be computed by the histogram uniformity evaluator 922.

In some examples of the presently disclosed subject matter, the average calculation can be limited to the average of 'active' bins, i.e. for instance, of bins containing at least two pixels. In further examples of the presently disclosed subject matter, the average calculation can by limited to a sub-group of histogram bins. Thus, for example, the bins on the edges of the histogram which relate to very low and/or very high numerical values (e.g. values above and/or below a predetermined threshold) can be discarded. Although not specifically mentioned with reference to other measures, it would be appreciated that truncation of very low and/or very high numerical values can be implemented as part of further ones of the measures described herein.

Mathematically the computation in block 1015 can be described as follows: if H is a 256 bin histogram of a set of pixels, then define an average value Havg can be defined as: Havg=mean(H where H>1). Then, the measure of non-uniformity can be calculated as the ratio: {# of elements in H that are smaller than Havg}/{# of elements in H that are larger than Havg}. It is appreciated that by way of non-limiting example, for relatively highly photo-realistic images, where the pixels have a relatively flat distribution this value can be expected to be small, for instance ~1 for an almost flat histogram, whereas for image tiles with relatively high synthetic quality—where the histogram often consists of isolated spikes, this value can be expected to be larger, for instance approximately 250 for a histogram with a single dominant spike, or approximately 50 for a few dominant spikes.

As part of computing further measures of photo-realism in an input image that is based on a numerical distribution of pixel luminance values within the input image, histogram bins having a peak value can be identified (block 1020). At block 1025, the average of the histogram bins computed at block 1010, and the histogram bins having peak values computed at block 1020 can be used to compute a relation between histogram bins having a maxima value and an average value of the bins. In this regard it would be appreciated that in images having a relatively synthetic image data, the maxima are often characterized as narrow and high peaks.

According to examples of the presently disclosed subject matter, the histogram peak extremity evaluator 924 can be adapted to implement this measure.

Another example of a measure which can be used to evaluate a numerical distribution of pixel luminance values within the input image involves computing a relation among histogram bins having a maxima value and values of histogram bins on either side thereof (block 1030). By way of example, the histogram bins having a peak value that were identified in block 1020 can be used. In other examples, a separate process is implemented for identifying local maxima values. Still further by way of example, a number of narrow maxima bikes may be quantified as the number of maxima bins whose value exceeds the neighboring bin values on either side by a predetermined factor, for instance by at least a factor of ×4.

According to examples of the presently disclosed subject matter, the histogram peak width evaluator 926 can be configured to implement this measure.

Yet another example of a measure which can be used to evaluate a numerical distribution of pixel luminance values within the input image involves computing absolute differences between adjacent histogram bins (block 1035). By way of example, the values around histogram edges may be disregarded in this measure. Still further by way of example this measure can involve measuring the sum of absolute differences between each adjacent bin pair in the histogram. So, by way of example, for a histogram of length 256, possibly the following calculation can be used. It would be appreciated that in many cases, for smooth histograms, seen in relatively photo-realistic images, this computation is expected to yield a significantly lower value compared to histograms that are characterized by a very "non-smooth" outline. Images having significant synthetic content are expected to yield such a "non-smooth" outline.

According to examples of the presently disclosed subject matter, the histogram smoothness evaluator 928 can be configured to implement this measure.

As is shown in FIG. 10, in case more than one measure that is based on an evaluation of a numerical distribution of pixel luminance values in the input image is implemented as part of the evaluation of a degree of photo-realism in the input image, the plurality (two or more) of measures that are used to evaluate the numerical distribution of pixel luminance in the input image can be combined or aggregated to provide a combined score for the numerical distribution of pixel luminance in the input image (block 1040). According to examples of the presently disclosed subject matter, the pixel value numerical distribution analyzer 920 can include an aggregator 925 that is configured to aggregate values that were computed by two or more of: the histogram uniformity evaluator 922, the histogram peak extremity evaluator 924, the histogram peak width evaluator 926 and the histogram smoothness evaluator 928 or by any other module that is used to compute a value which is intended for being used to evaluate a degree of photo-realism in the input image based on a numerical distribution of pixel luminance values within the input image. The combined value can be used as the value representing a degree of photo-realism in the input image based on a numerical distribution of pixel luminance values within the input image.

As mentioned above, according to examples of the presently disclosed subject matter, in addition to the measures (or measure) that are computed based on an evaluation of a numerical distribution of pixel luminance values in the input image claim, one or more measures that are based on an evaluation of a spatial distribution of pixel luminance values in the input image can be implemented as part of an evaluation of a degree of photo-realism in the input image (block 1045).

Based on the score or value that was computed based on an evaluation of a numerical distribution of pixel luminance values in the input image, and possibly also based on the value that was computed based on an evaluation of a spatial distribution of pixel luminance values in the input image, there can be computed a value indicating a degree of photo-realism for the input image based on a distribution of pixel luminance values within the input image (block 1050). In this regard, it would be appreciated that according to examples of the presently disclosed subject matter, value indicating a degree of photo-realism for the input image based on a distribution of pixel luminance values within the input image can be based on an evaluation of a numerical and/or a spatial a distribution of pixel luminance values within the input image.

As already described above, the value indicating a degree of photo-realism in the input image can be used to calculate a configuration parameter (block 230), and the encoder 150 can be programmed to compress the input image according to the calculated configuration parameter (block 240).

Having described some examples of measures which are based on an evaluation of a numerical distribution of pixel luminance values within the input image, there is now provided a description of measures according to examples of the presently disclosed subject matter which are based on an evaluation of a spatial distribution of pixel luminance values within the input image.

Figure 11:
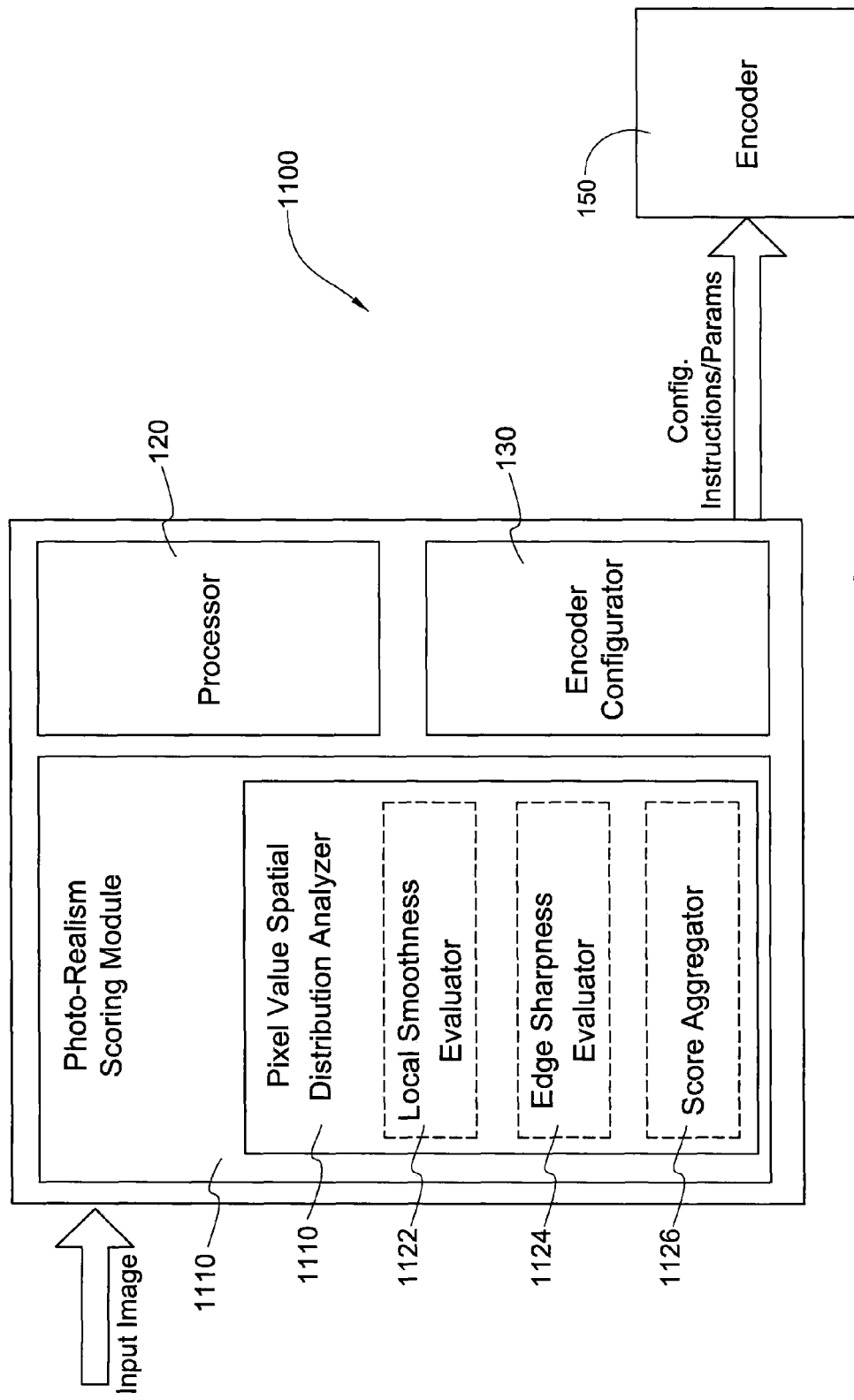
FIG. 11 is a block diagram illustration of a block diagram illustration of a system for controlling a compression of an image according to a degree of photo-realism in the image that is calculated based on various measures of a spatial distribution of pixel luminance values within the input image, according to examples of the presently disclosed subject matter.

Reference is made to FIG. 11, which is a block diagram illustration of a system for controlling a compression of an image according to a degree of photo-realism in the image that is calculated based on various measures of a spatial distribution of pixel luminance values within the input image, according to examples of the presently disclosed subject matter. According to examples of the presently disclosed subject matter, the system 1100 can have a photo-realism scoring module 1110 which in turn includes a pixel value spatial distribution evaluation module 1120, and the pixel value spatial distribution evaluation module 1120 can consist of one or more of a local smoothness evaluator 1122 and a sharp edge evaluator 1124. The pixel value spatial distribution evaluation module 1120 can further include a score aggregator 1126.

Figure 12:
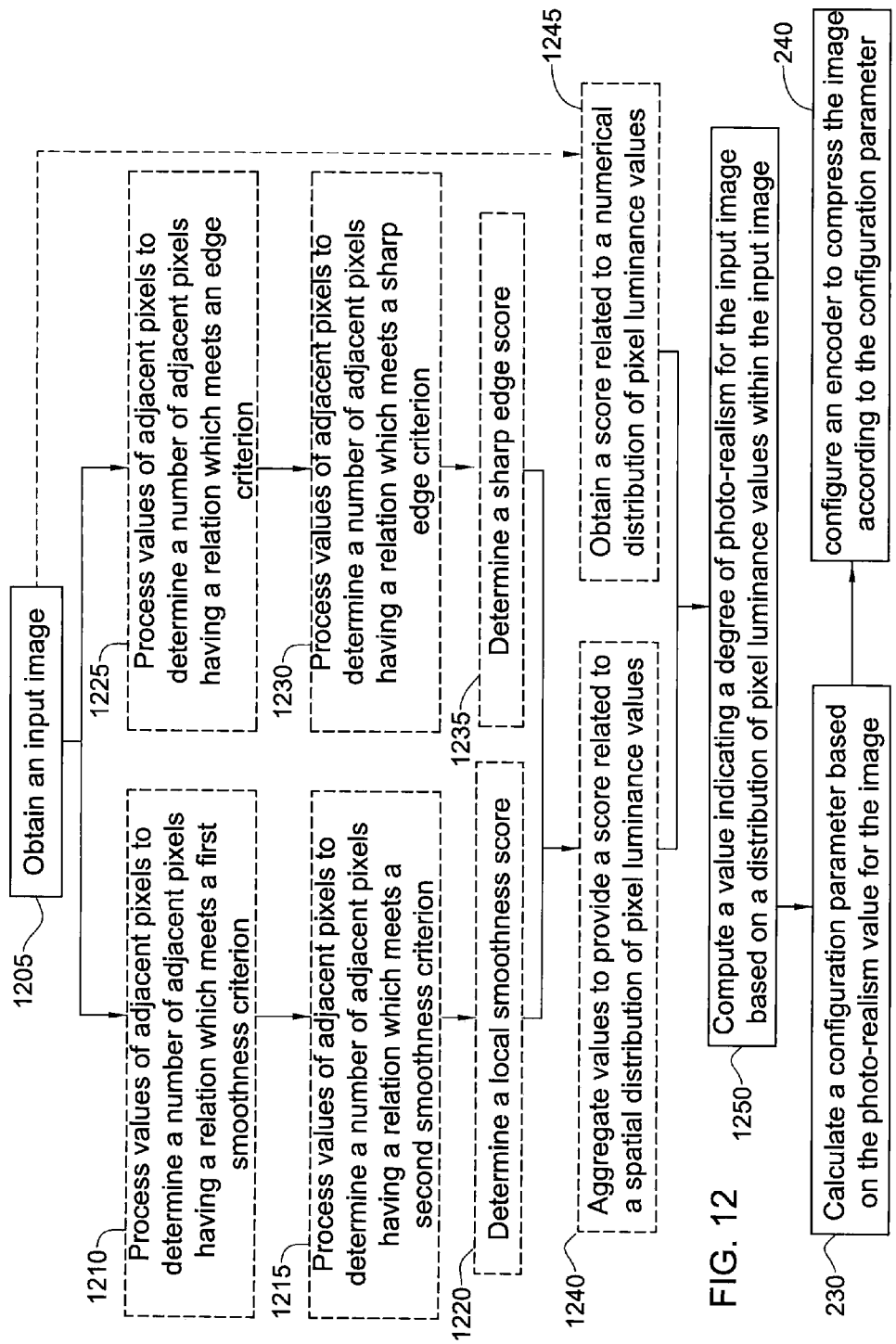
FIG. 12 is a flowchart illustration of a method of controlling a compression of an image according to a degree of photo-realism in the image that is calculated based on various measures of a spatial distribution of pixel luminance values in the input image, according to examples of the presently disclosed subject matter.

Reference is now additionally made to FIG. 12, which is a flowchart illustration of a method of controlling a compression of an image according to a degree of photo-realism in the image that is calculated based on various measures of a spatial distribution of pixel luminance values in the input image, according to examples of the presently disclosed subject matter. According to examples of the presently disclosed subject matter, an input image can be received at the system 1100 (block 210).

There is provided a description of several measures of a degree of photo-realism in the input image that are based on a spatial distribution of pixel luminance values within the input image. In accordance with examples of the presently disclosed subject matter, one or more of the measures described below can be implemented as part of an evaluation of a degree of photo-realism for an input image that is based on a spatial distribution of pixel luminance values within the input image. It would be appreciated that in further examples of the presently disclosed subject matter, one or more additional measures including measures that are based on an evaluation of a degree of photo-realism for an input image that is based on a spatial distribution of pixel luminance values within the input image and/or measures that are based on an evaluation of a degree of photo-realism for an input image that is based on a numerical distribution of pixel luminance values within the input image, can be combined with any one or with any combination of the measures described hereinbelow.

One measure of a degree of photo-realism in an input image that is based on a spatial distribution of pixel luminance values within the input image and which can be used as part of examples of the presently disclosed subject matter, can involve an evaluation of a degree of local smoothness in the input image. According to examples of the presently disclosed subject matter, the implementation of this measure can involve: processing values of adjacent pixels in the input image to determine a number of adjacent pixels having a relation which meets a first smoothness criterion (block 1210), processing values of adjacent pixels to determine a number of adjacent pixels having a relation which meets a second smoothness criterion (block 1215), and determining a local smoothness score. According to examples of the presently disclosed subject matter, the second smoothness criterion demands a substantially higher degree of smoothness relative to the first smoothness criterion. It would be appreciated that this measure can be used to locate areas in the image that are very smooth—to an extent which is expected to be found more in relatively "synthetic" images than in relatively "photo-realistic" images, based on the assumption that relatively "photo-realistic" usually have some extent of noise or texture even in 'flat' areas. This measure can be implemented by the local smoothness evaluator 1122.

Another measure of a degree of photo-realism in an input image that is based on a spatial distribution of pixel luminance values within the input image and which can be used as part of examples of the presently disclosed subject matter, can involve processing values of adjacent pixels to determine a number of adjacent pixels having a relation which meets an edge criterion (block 1225), process values of adjacent pixels to determine a number of adjacent pixels having a relation which meets a sharp edge criterion (block 1230), and determining a sharp edge score (block 1235). In this regard, it would be appreciated that synthetic images are often characterized by very sharp edges, as well having very smooth areas with zero texture or noise. However, due to the physics of the capturing and processing devices, photo-realistic images generally have some blurring at edges, and noise or presence of texture even in smooth areas.

According to further examples of the presently disclosed subject matter, an edge sharpness score can be computed by evaluating furthest neighbor values as follows: for each pixel, the absolute difference between the pixel and each of its neighboring pixels (say the eight neighboring pixels) can be calculated. If the maximum value among the absolute differences exceeds a predetermined threshold, such as 5 for example, this pixel is considered to be an edge pixel. If the maximum absolute difference also exceeds a second, higher, threshold—such as 30 or 40, then this pixel is considered to be a sharp edge pixel. Then, the ratio between the number of sharp edges and the number of total edges indicates the presence of sharp edges in the image tile.

According to examples of the presently disclosed subject matter, the sharp edge pixel measure can be computed by the edge sharpness evaluator 1124.

As is shown in FIG. 12, in case more than one measure that is based on an evaluation of a spatial distribution of pixel luminance values in the input image is implemented as part of the evaluation of a degree of photo-realism in the input image, the plurality (two or more) of measures that are used to evaluate the spatial distribution of pixel luminance in the input image can be combined or aggregated to provide a combined score for the spatial distribution of pixel luminance in the input image (block 1240). According to examples of the presently disclosed subject matter, the pixel value-spatial distribution analyzer 1120 can include an aggregator 1226 that is configured to aggregate values that were computed by the local smoothness evaluator 1122 and by the sharp edge evaluator 1124 or by any other module that is used to compute a value which is intended for being used to evaluate a degree of photo-realism in the input image based on a spatial distribution of pixel luminance values within the input image. The combined value can be used as the value representing a degree of photo-realism in the input image based on a spatial distribution of pixel luminance values within the input image.

As mentioned above, according to examples of the presently disclosed subject matter, in addition to the measures (or measure) that are computed based on an evaluation of a spatial distribution of pixel luminance values in the input image claim, one or more measures that are based on an evaluation of a numerical distribution of pixel luminance values in the input image can be implemented as part of an evaluation of a degree of photo-realism in the input image (block 1245).

Based on the score or value that was computed based on an evaluation of a spatial distribution of pixel luminance values in the input image, and possibly also based on the value that was computed based on an evaluation of a numerical distribution of pixel luminance values in the input image, there can be computed a value indicating a degree of photo-realism for the input image based on a distribution of pixel luminance values within the input image (block 1250).

In the above description of some of the examples of the presently disclosed subject matter, it was suggested to combine the measures that are computed based on an evaluation of a numerical distribution of pixel luminance values together to provide a value which indicates a degree of photo-realism in the input image that is based on a numerical distribution of pixel luminance values, and to separately combine the measures that are computed based on an evaluation of a numerical distribution of pixel luminance values together to provide a value which indicates a degree of photo-realism in the input image that is based on a spatial distribution of pixel luminance values, and subsequently combine the two values, i.e, the value which indicates a degree of photo-realism in the input image that is based on a numerical distribution of pixel luminance values with the value which indicates a degree of photo-realism in the input image that is based on a spatial distribution of pixel luminance values to obtain the overall score (or the value indicating a degree of photo-realism for an input image based on a distribution of pixel luminance values within the image). It should however be noted that in further examples of the presently disclosed subject matter, the multiple measures that are used to evaluate a degree of photo-realism in the input image are all combined together without distinction among measures that are based on a numerical distribution of pixel luminance values on the one hand, and measures that are based on a spatial distribution of pixel luminance values on the other hand. It would be further appreciated that these two approaches can significantly differ, for example, when non-linear operations, such as clipping, are applied by the aggregator.

As already described above, the value indicating a degree of photo-realism in the input image can be used to calculate a configuration parameter (block 230), and the encoder 150 can be programmed to compress the input image according to the calculated configuration parameter (block 240).

Additional measures which can be used according to examples of the presently disclosed subject matter, to evaluate a degree of photo-realism in an input can include measures that are related to the chrominance components of the image. Such components can be based on the assumption that in synthetic images the colors are often more saturated than in relatively more photo-realistic images. Thus, a score which provides a measure of an extent of photo-realism in an input image can be computed based on an indication of the chrominance saturation. The indication of chrominance saturation can be computed directly in the DCT plane, by evaluating the number of DC coefficients that exceed a predetermined threshold.

Still further by way of example, a measure which is related to the existence of sharp edges along with smooth regions in the image tile can be used as part of the evaluation of the degree of photo-realism in the input image. This measure can be based on the luminance DCT coefficients. As part of the implementation of this measure, non-negligent AC energy in each DCT block may be defined, for instance as follows: if the sum of the absolute non-DC DCT values is at least 0.1% of the DC absolute value, the 8×8 block is considered to contain non-negligible AC energy. Then the 8×8 blocks can be processed, and count the number of cases where for two neighboring blocks one has non-negligible AC energy and the other does not. In synthetic images it can be expected to find a relatively high number of such pairs, whereas in photo-realistic images such pair would typically be relatively rare.

So far, the examples of the presently disclosed subject matter described herein involved the use of different measures of a distribution of pixel luminance values within an input image for evaluating a degree of photo-realism in the input image. According to examples of the presently disclosed subject matter, any of the measures of a distribution of pixel luminance values within an input image that were described above can be=applied to a tile which is a portion of the input image. Applying one or more of the measures described above to an image tile can be used for evaluating a degree of photo-realism in the respective input image tile. The resulting value which indicates a degree of photo-realism in the respective input image tile can be used to calculate a corresponding configuration parameter, and the configuration parameter can be used to configure an encoder to encoder the respective tile according to the configuration parameter(s) that was calculated for the input image tile.

According to examples of the presently disclosed subject matter, in order to support the evaluation of a degree of photo-realism at the tile level of an input image, the various implementations of a system for controlling a compression of an image according to a degree of photo-realism in the image, according to examples of the presently disclosed subject matter (in particular the systems shown in FIGS. 1, 3, 5, 7, 9 and 11) can include a tiling module which is configured to partition the input image into to tiles, and to manage the evaluation of the resulting plurality of tiles. The tiling module can also control the processing of the value indicating a degree of photo-realism that is computed for the different tiles, including the calculation of the configuration parameters based on the photo-realism value the was computed for the tile, and the configuration of the encoder with the appropriate configuration parameters. The feeding of the configuration parameters for a given tile can be made with reference to the tile for which the configuration parameters are provided, thus enabling the encoder to apply the configuration parameters to the correct tile of the input image.

It would be appreciated that some encoders, such as, for example, the encoders described in PCT Publication No. PCTIL2010000809 and H.263 (particularly in ver. 2 with annex T) and H.264 are capable of encoding different tiles of a given input image according to different encoding parameters. Still further by way of example, some encoders are responsive to receiving different encoding parameters for different tiles. For instance, the image compression described in PCT Publication No. PCTIL2010000809 can operate in a mode where the image undergoes tiling, and is divided into multiple tiles. For each tile an appropriate MQF value is computed so that target quality for that tile is obtained. By obtaining a per-tile encoding configuration parameter, for example the target quality can be adapted for each tile, thus guaranteeing perceptually lossless compression of each tile according to the degree of photo-realism in the tile. Further by way of example, the configuration parameter may be used to perform adaptive image compression using H.264 Intra frames. In H.264 Intra frame encoding, an image may be encoded to a certain quality level by controlling the value of the macroblock Quantization Parameter—QP. Larger values of QP yield higher compression at lower quality. Lower values yield lower compression at higher quality. Assuming the system is preconfigured to a QP value which yields appropriate quality for photo-realistic content, the per tile configuration parameter can be used to adapt the QP value for each macroblock according to the tile it is associated with. For instance for a macroblock ("MB") associated with a tile that is deemed highly 'synthetic' the QP can be decreased for that MB according to the computed encoding configuration parameter.

It would be appreciated that being able to evaluate a degree of photo-realism at the tile level of an input image can be particularly beneficial for image that have mixed content where some of the tiles have relatively synthetic content whereas other tiles are relatively more photo-realistic in nature. For instance: a highly photo-realistic image with a localized overlay of computer graphics or text. Furthermore, it would be appreciated that when dealing with collections of images having a large range of resolutions can make creating a reliable classifier more challenging, whereas tile sizes lie in a more limited range.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of controlling a compression of an input image according to a degree of photo-realism in the input image, comprising:
   computing a photo-realism value indicating a degree of photo-realism for the input image based on a numerical distribution of pixel luminance values within the input image, including processing a histogram of the input image which denotes the numerical distribution of pixel luminance values within the input image, wherein said processing comprises computing a relation among histogram bins having a value that is above an average and histogram bins having a value below the average;
   calculating a configuration parameter based on the photo-realism value for the input image; and
   configuring an encoder to compress the input image according to the configuration parameter.

2. The method according to claim 1, further comprising:
   tiling the input image giving rise to a plurality of input image tiles;
   computing a photo-realism value indicating a degree of photo-realism for each one of the plurality of input image tiles based on a numerical distribution of pixel luminance values within the respective input image tile;
   calculating a configuration parameter for each one of the plurality of input image tiles based on the photo-realism value that was computed for the input image tile; and
   configuring an encoder to compress each one of the plurality of input image tiles according to its respective configuration parameter.

3. The method according to claim 2, wherein a configuration parameter for an input image tile having a relatively low photo-realism value is effective for configuring the encoder to apply a relatively low compression level to the respective input image tile.

4. The method according to claim 1, wherein the degree of photo-realism is associated with a spatial distribution of the pixel luminance values within the input image.

5. The method according to claim 4, wherein said computing comprises processing values of adjacent pixels to determine a local smoothness score representing a relation between a number of adjacent pixels having a relation which meets a first smoothness criterion and a number of adjacent pixels having a relation which meets a second smoothness criterion, where the second smoothness criterion demands a substantially higher degree of smoothness relative to the first smoothness criterion.

6. The method according to claim 4, wherein said computing comprises processing values of adjacent pixels to determine a sharp edge score representing a relation between a number of adjacent pixels having a relation which meets an edge criterion and a number of adjacent pixels having a relation which meets a sharp edge criterion.

7. The method according to claim 5, wherein said computing comprises processing values of adjacent pixels to determine a sharp edge score representing a relation between a number of adjacent pixels having a relation which meets an edge criterion and a number of adjacent pixels having a relation which meets a sharp edge criterion.

8. The method according to claim 1, wherein said processing the histogram comprises computing a relation between histogram bins having a maxima value and an average value of the bins.

9. The method according to claim 1, wherein said processing the histogram comprises computing a relation among histogram bins having a maxima value and values of histogram bins on either side of the histogram bins having the maxima value.

10. The method according to claim 1, wherein said processing the histogram comprises computing absolute differences between adjacent histogram bins.

11. The method according to claim 1, wherein the photo-realism measure is associated with a spatial distribution of the pixel luminance values within the input image.

12. The method according to claim 1, wherein said processing the histogram comprises computing a relation between histogram bins having a maxima value and an average value of the bins.

13. The method according to claim 1, wherein said processing the histogram comprises computing a relation among histogram bins having a maxima value and values of histogram bins on either side of the histogram bins having the maxima value.

14. The method according to claim 1, wherein said processing the histogram comprises computing absolute differences between adjacent histogram bins.

15. A method of controlling a compression of an input image according to a degree of photo-realism in the input image, comprising:
   computing a photo-realism value indicating a degree of photo-realism for the input image based on a numerical distribution of pixel luminance values within the input image, including processing a histogram of the input image which denotes the numerical distribution of pixel luminance values within the input image, wherein said processing the histogram comprises computing a relation between histogram bins having a maxima value and an average value of the bins;
   calculating a configuration parameter based on the photo-realism value for the input image; and
   configuring an encoder to compress the input image according to the configuration parameter.

16. A method of controlling a compression of an input image according to a degree of photo-realism in the input image, comprising:
   computing a photo-realism value indicating a degree of photo-realism for the input image based on a numerical distribution of pixel luminance values within the input image, including processing a histogram of the input image which denotes the numerical distribution of pixel luminance values within the input image, wherein the degree of photo-realism is associated with a spatial distribution of the pixel luminance values within the input image;

calculating a configuration parameter based on the photo-realism value for the input image; and configuring an encoder to compress the input image according to the configuration parameter.

* * * * *